(12) United States Patent
Hashizume

(10) Patent No.: US 8,508,631 B2
(45) Date of Patent: Aug. 13, 2013

(54) PIXEL DEFECT DETECTION AND CORRECTION DEVICE, IMAGING APPARATUS, PIXEL DEFECT DETECTION AND CORRECTION METHOD, AND PROGRAM

(75) Inventor: Jun Hashizume, Tokyo (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 12/923,917

(22) Filed: Oct. 14, 2010

(65) Prior Publication Data

US 2011/0102649 A1 May 5, 2011

(30) Foreign Application Priority Data

Nov. 2, 2009 (JP) .................................. 2009-252447

(51) Int. Cl.
*H04N 9/64* (2006.01)
(52) U.S. Cl.
USPC .......................................................... 348/246
(58) Field of Classification Search
USPC .......................................................... 348/246
See application file for complete search history.

(56) References Cited

U.S. PATENT DOCUMENTS

| 7,092,018 | B1 * | 8/2006 | Watanabe ...................... 348/247 |
| 7,283,165 | B2 * | 10/2007 | Alderson et al. .............. 348/246 |
| 2006/0012694 | A1 | 1/2006 | Yoneda et al. |
| 2006/0257046 | A1 * | 11/2006 | Rai et al. ....................... 382/275 |
| 2008/0151082 | A1 * | 6/2008 | Chan ............................. 348/246 |
| 2008/0298716 | A1 * | 12/2008 | Yamagata ..................... 382/275 |
| 2009/0091642 | A1 * | 4/2009 | Minema et al. ............... 348/246 |
| 2010/0066871 | A1 * | 3/2010 | Atanassov et al. ............ 348/246 |

FOREIGN PATENT DOCUMENTS

JP 3747909 12/2005

* cited by examiner

*Primary Examiner* — James Hannett
(74) *Attorney, Agent, or Firm* — Rader, Fishman & Grauer PLLC

(57) ABSTRACT

A pixel defect detection and correction device includes: an average value acquisition section that acquires an average value of pixel values of adjacent pixels with different colors excluding a pixel whose defect is to be detected, which is a pixel of interest, in a processing region where adjacent pixels with the same color and adjacent pixels with different colors are arrayed with the pixel whose defect is to be detected in the middle; and a defect determining section that determines whether the pixel whose defect is to be detected is defective on the basis of at least the average value. The defect determining section determines whether the pixel whose defect is to be detected is defective by comparison of the pixel value of the pixel whose defect is to be detected, the average value of adjacent pixels with different colors, and a designated different-color pixel threshold value.

20 Claims, 9 Drawing Sheets

BAYER ARRANGEMENT

PRCA PROCESSING REGION OF 5 × 5

R: RED
Gr: ODD-COLUMN GREEN
B: BLUE
Gb: EVEN-COLUMN GREEN

PIXEL WHOSE DEFECT IS TO BE DETECTED / DJPX

ADJACENT PIXELS WITH THE SAME COLOR

PIXEL WHOSE DEFECT IS TO BE DETECTED / DJPX

ADJACENT PIXELS WITH DIFFERENT COLORS

FIG.12

| 227 | 186 | 261 | 263 | 1000 |
|---|---|---|---|---|
| 146 | 235 | 211 | 522 | 1006 |
| 242 | 190 | 940 | 506 | 1023 |
| 161 | 282 | 370 | 1023 | 1023 |
| 284 | 227 | 682 | 1023 | 1023 |

AVERAGE VALUE OF ADJACENT  265.75
PIXELS WITH DIFFERENT COLORS

THE SAME COLOR MAX  1023     DIFFERENT COLORS MAX  1023
THE SAME COLOR MIN  227      DIFFERENT COLORS MIN  190

PIXEL DEFECT DETECTION AND CORRECTION DEVICE, IMAGING APPARATUS, PIXEL DEFECT DETECTION AND CORRECTION METHOD, AND PROGRAM

BACKGROUND OF THE INVENTION

1. Field of the Invention

The present invention relates to a pixel defect detection and correction device with a function of detecting and compensating for a defective pixel in a solid state imaging device, such as a CCD or a CMOS sensor, an imaging apparatus, a pixel defect detection and correction method, and a program.

2. Description of the Related Art

Generally, it is known that a defective pixel is generated in a solid state imaging device, such as a CCD (Charge Coupled Device) and a CMOS (Complementary Metal Oxide Semiconductor) sensor.

In such a solid state imaging device, it is known that a defective pixel, which outputs an abnormal imaging signal, is generated due to a local crystal defect of a semiconductor device and the like and this causes deterioration of the image quality.

Examples of the defective pixel include a black defective pixel and a white defective pixel.

That is, pixel defects of a solid state imaging device include a white defect, which is caused by an addition of a predetermined amount of electric charges to the normal signal level, and a black defect, by which the signal level drops at a predetermined rate or a signal level around zero is output all the time.

Since these defects cause deterioration of the image quality at the time of image output, various kinds of defect detection and correction methods have been proposed (for example, see Japanese Patent No. 3747909).

In order to determine whether or not a pixel of interest is defective, it is general to set a certain threshold value and to determine that the pixel of interest is defective when the value of the pixel of interest exceeds the threshold value.

In normal techniques, a value obtained by multiplying the maximum and minimum values of eight adjacent pixels with the same color or different colors by a coefficient, which can be set from the outside, is generally used as the threshold value.

SUMMARY OF THE INVENTION

In such a defect detection method, however, when a high-brightness pixel, for example, from a portion of which light is reflected, exists around a pixel of interest, the signal level of the high-brightness pixel is used as the threshold value for defect determination. Accordingly, for example, even if the pixel of interest is defective, the pixel of interest may not be recognized as a defective pixel.

In addition, such a defect tends to stand out to the eye.

For example, in the technique disclosed in Japanese Patent No. 3747909, the value obtained by multiplying the maximum and minimum values of adjacent pixels with the same color or different colors by the coefficient is used as the threshold value for defect determination. Accordingly, particularly when a pixel with a high brightness value exists near a pixel whose defectiveness is to be determined, defect determination may not be able to be performed.

Moreover, in this technique, although correlation is used, the color difference or the brightness in the longitudinal direction are not taken into consideration and the operation tends to be complicated.

In view of the above, it is desirable to provide a pixel defect detection and correction device, an imaging apparatus, a pixel defect detection and correction method, and a program capable of detecting a pixel defect even if a pixel of a large value exists in adjacent pixels with the same color.

According to an embodiment of the present invention, there is provided a pixel defect detection and correction device including: an average value acquisition section that acquires an average value of pixel values of adjacent pixels with different colors excluding a pixel whose defect is to be detected, which is a pixel of interest, in a processing region where a plurality of adjacent pixels with the same color and a plurality of adjacent pixels with different colors are arrayed with the pixel whose defect is to be detected in the middle; and a defect determining section that determines whether or not the pixel whose defect is to be detected is defective on the basis of at least the average value acquired by the average value acquisition section. The defect determining section determines whether or not the pixel whose defect is to be detected is defective by comparison of the pixel value of the pixel whose defect is to be detected, the average value of adjacent pixels with different colors acquired by the average value acquisition section, and a designated different-color pixel threshold value.

According to another embodiment of the present invention, there is provided an imaging apparatus including: a pixel section including an imaging device which images a subject image; and a pixel defect detection and correction device that receives image data from the imaging device and performs pixel defect detection and correction processing. The pixel defect detection and correction device includes: an average value acquisition section that acquires an average value of pixel values of adjacent pixels with different colors excluding a pixel whose defect is to be detected, which is a pixel of interest, in a processing region where a plurality of adjacent pixels with the same color and a plurality of adjacent pixels with different colors are arrayed with the pixel whose defect is to be detected in the middle; and a defect determining section that determines whether or not the pixel whose defect is to be detected is defective on the basis of at least the average value acquired by the average value acquisition section. The defect determining section determines whether or not the pixel whose defect is to be detected is defective by comparison of the pixel value of the pixel whose defect is to be detected, the average value of adjacent pixels with different colors acquired by the average value acquisition section, and a designated different-color pixel threshold value.

According to still another embodiment of the present invention, there is provided a pixel defect detection and correction method including the steps of: acquiring an average value of pixel values of adjacent pixels with different colors excluding a pixel whose defect is to be detected, which is a pixel of interest, in a processing region where a plurality of adjacent pixels with the same color and a plurality of adjacent pixels with different colors are arrayed with the pixel whose defect is to be detected in the middle; and determining whether or not the pixel whose defect is to be detected is defective on the basis of the average value acquired in the average value acquisition step. In the defect determination step, it is determined whether or not the pixel whose defect is to be detected is defective by comparison of the pixel value of the pixel whose defect is to be detected, the average value of adjacent pixels with different colors acquired in the average value acquisition step, and a designated different-color pixel threshold value.

According to yet another embodiment of the present invention, there is provided a program causing a computer to execute pixel defect detection and correction processing including: average value acquisition processing for acquiring an average value of pixel values of adjacent pixels with different colors excluding a pixel whose defect is to be detected, which is a pixel of interest, in a processing region where a plurality of adjacent pixels with the same color and a plurality of adjacent pixels with different colors are arrayed with the pixel whose defect is to be detected in the middle; and defect determination processing for determining whether or not the pixel whose defect is to be detected is defective on the basis of the average value acquired in the average value acquisition processing. In the defect determination processing, it is determined whether or not the pixel whose defect is to be detected is defective by comparison of the pixel value of the pixel whose defect is to be detected, the average value of adjacent pixels with different colors acquired in the average value acquisition processing, and a designated different-color pixel threshold value.

According to the embodiments of the present invention, it is possible to detect a pixel defect even when a pixel with a large value exists in adjacent pixels with the same color.

BRIEF DESCRIPTION OF THE DRAWINGS

FIG. 12 is a view showing an example of actual calculation.

DESCRIPTION OF THE PREFERRED EMBODIMENTS

Hereinafter, embodiments of the present invention will be described with reference to the accompanying drawings.

In addition, the explanation will be given in the following order.

1. Example of the entire configuration of an imaging apparatus
2. Example of the configuration of a pixel section
3. Example of the configuration of a defect detection and correction circuit
4. Explanation regarding defect detection and correction processing <1. Example of the Entire Configuration of an Imaging Apparatus>

Figure 1:
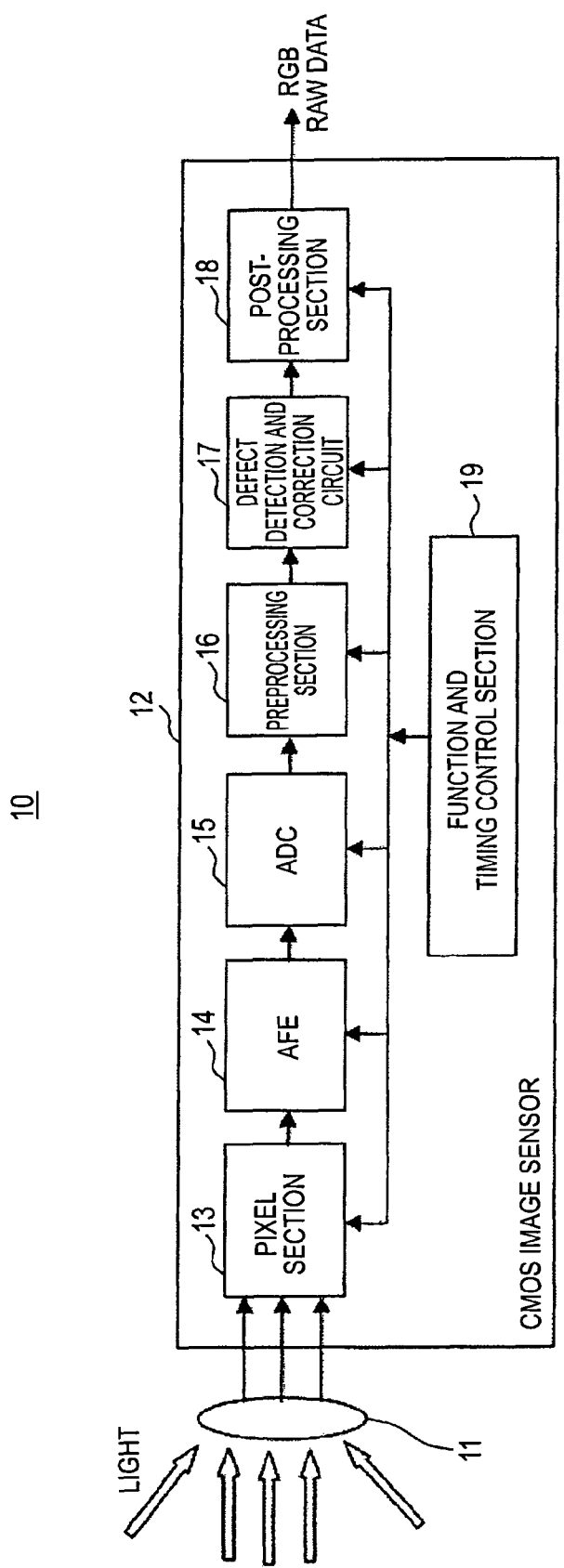
FIG. 1 is a block diagram showing an example of the configuration of an imaging apparatus to which a pixel defect detection and correction device according to the present embodiment of the present invention is applied.

FIG. 1 is a block diagram showing an example of the configuration of an imaging apparatus to which a pixel defect detection and correction device according to an embodiment of the present invention is applied.

As shown in FIG. 1, an imaging apparatus 10 includes an optical system 11 and a CMOS image sensor 12 as a solid state imaging device.

The optical system 11 forms a subject image on the imaging surface of the imaging device 12.

The CMOS image sensor 12 includes a pixel section 13, an analog front end (AFE) 14, an analogue to digital converter (ADC) 15, and a preprocessing section 16.

The CMOS image sensor 12 includes a defect detection and correction circuit 17 which adopts a pixel defect detection and correction method according to the embodiment of the present invention, a post-processing section 18, and a function and timing control section 19.

The pixel section 13 is formed by a CMOS sensor, and a plurality of unit pixels are arrayed in a matrix.

Figure 2:
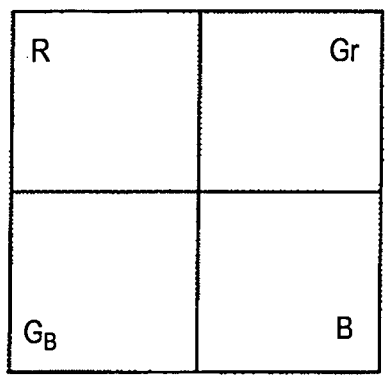
FIG. 2 is a view showing a Bayer arrangement as an example of the pixel arrangement.

For example, a Bayer arrangement shown in FIG. 2 is adopted as the pixel arrangement in the pixel section 13.

Figure 3:
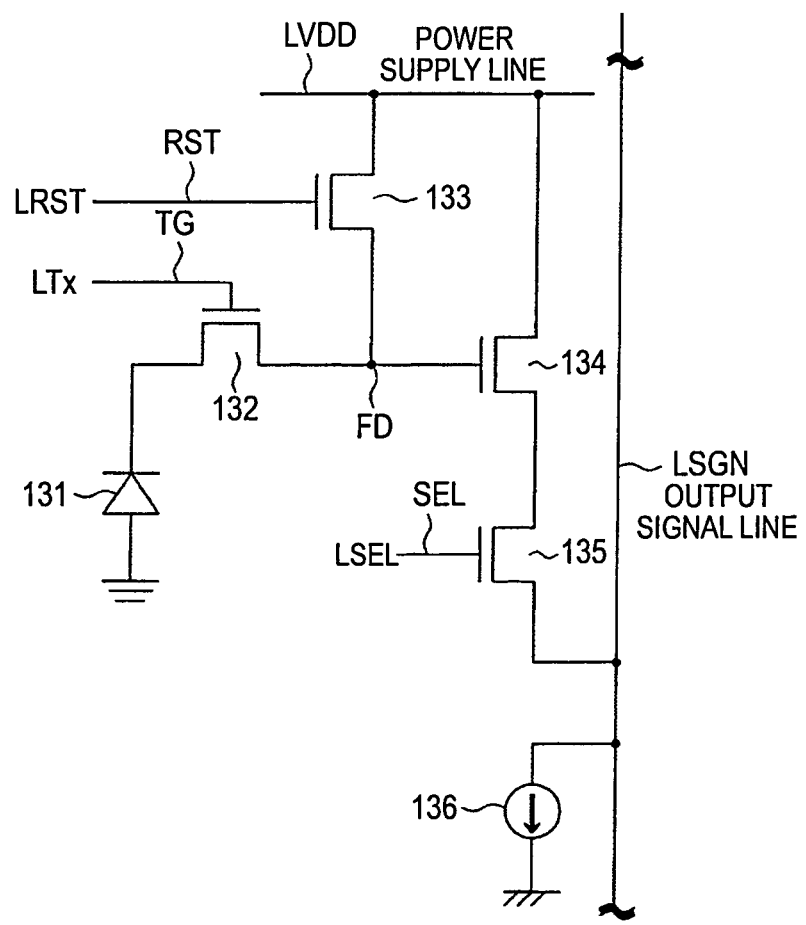
FIG. 3 is a circuit diagram showing an example of the configuration of a unit pixel of a pixel section according to the present embodiment.

FIG. 3 is a circuit diagram showing an example of the configuration of a unit pixel in the pixel section 13 in the present embodiment.

FIG. 3 shows an example of a pixel of a CMOS image sensor formed by four transistors in the present embodiment.

Each pixel circuit 130 has a photoelectric conversion element 131 formed by a photodiode, for example, as shown in FIG. 3.

In addition, the pixel circuit 130 has four transistors of a transfer transistor 132, a reset transistor 133, an amplifying transistor 134, and a selection transistor 135, as active elements for the one photoelectric conversion element 131.

The photoelectric conversion element 131 performs photoelectric conversion of incident light into an electric charge (here, an electron) corresponding to the amount of light.

The transfer transistor 132 is connected between the photoelectric conversion element 131 and a floating diffusion FD, and a transmission signal TG which is a control signal is transmitted to a gate (transfer gate) of the transfer transistor 132 through a transfer control line LTx.

Accordingly, the transfer transistor 132 transfers to the floating diffusion FD an electron photoelectrically converted by the photoelectric conversion element 131.

The reset transistor 133 is connected between a power supply line LVDD and the floating diffusion FD, and a reset signal RST which is a control signal is transmitted to a gate of the reset transistor 133 through a reset control line LRST.

Accordingly, the reset transistor 133 resets the electric potential of the floating diffusion FD to the electric potential of the power supply line LVDD.

A gate of the amplifying transistor 134 is connected to the floating diffusion FD. The amplifying transistor 134 is connected to a signal line LSGN through the selection transistor 135 and forms a source follower together with a constant current source 136 provided outside the pixel section.

In addition, a selection signal SEL which is a control signal according to an address signal is transmitted to a gate of the selection transistor 135 through a selection control line LSEL. As a result, the selection transistor 135 is turned on.

If the selection transistor 135 is turned on, the amplifying transistor 134 amplifies the electric potential of the floating diffusion FD and outputs the voltage corresponding to the electric potential to the signal line LSGN. The voltage output from each pixel is output to the AFE 14, which is a read circuit, through the signal line LSGN.

These operations are simultaneously performed for pixels of one row since the gates of the transfer transistor 132, the reset transistor 133, and the selection transistor 135 are connected in units of a row, for example.

In the pixel section 13, a set of the reset control line LRST, the transmission control line LTx, and the selection control line LSEL which are wired to a pixel array portion are wired in units of a row of the pixel arrangement.

The reset control line LRST, the transmission control line LTx, and the selection control line LSEL are driven by a vertical scanning circuit (not shown).

In addition, the output signal line LSGN is connected to a read circuit including a correlated double sampling (CDS) circuit and the like.

In the present embodiment, the AFE 14 is made to have the CDS circuit function.

When a defective pixel signal exists in a digital image signal obtained by performing digital signal processing with the preprocessing section 16, the defect detection and correction circuit 17 corrects the defective pixel signal using a defective pixel detection and correction method, which will be described in detail later, and outputs the digital signal after correction to the post-processing section 18.

In the present embodiment, the defect detection and correction circuit 17 has a function of calculating the threshold value, which is used for defect determination, using the average value of eight adjacent pixels with different colors in defect determination processing.

In addition, the defect detection and correction circuit 17 has a function of calculating the defect determination threshold value using the average value of six pixels excluding the maximum value and the minimum value, among eight adjacent pixels with different colors, in defect determination processing.

In addition, the defect detection and correction circuit 17 has a function of calculating the defect determination threshold value using the average value of six pixels excluding the maximum value and the minimum value, among eight adjacent pixels with different colors, in defect determination processing so that the threshold value can be changed for every color filter.

In addition, the defect detection and correction circuit 17 has a function of calculating the defect determination threshold value using the maximum value and the minimum value of eight adjacent pixels with the same color.

In addition, the defect detection and correction circuit 17 has a function of calculating the defect determination threshold value using the second maximum value and the second minimum value excluding the maximum value and the minimum value, among eight adjacent pixels with the same color.

Hereinafter, the outline of a function of the imaging apparatus 10 will be described, and then an example of the specific configuration of a pixel section and the specific configuration and a function of the defect detection and correction circuit 17 will be described.

[Outline of a Function of an Imaging Apparatus]

Incident light obtained from a subject is input to the pixel section 13 of the CMOS image sensor 12 through the optical system 11.

The incident light is converted into an electric signal by photoelectric conversion in the pixel section 13 and is then input to the AFE 14. The input electric signal is output as an electric signal after correlated double sampling and auto gain control (AGC) are performed by the AFE 14.

The electric signal output from the AFE 14 is output as a digital signal after A/D conversion processing is performed by the ADC 15.

Various kinds of digital processing on the digital signal are performed by the preprocessing section 16, and the digital signal is output to the defect detection and correction circuit 17.

When a defective pixel signal exists in the digital signal, the defect detection and correction circuit 17 corrects the defective pixel signal using the defective pixel detection and correction method, which will be described later, and outputs the digital signal after correction.

The digital signal is input to the post-processing section 18 and is output after various kinds of digital processing are performed. The digital signal becomes an output signal of the CMOS image sensor 12.

In addition, the function and timing control section 19 controls the operation of each section of the CMOS image sensor 12.

<2. Example of the Configuration of a Pixel Section>

Figure 4:
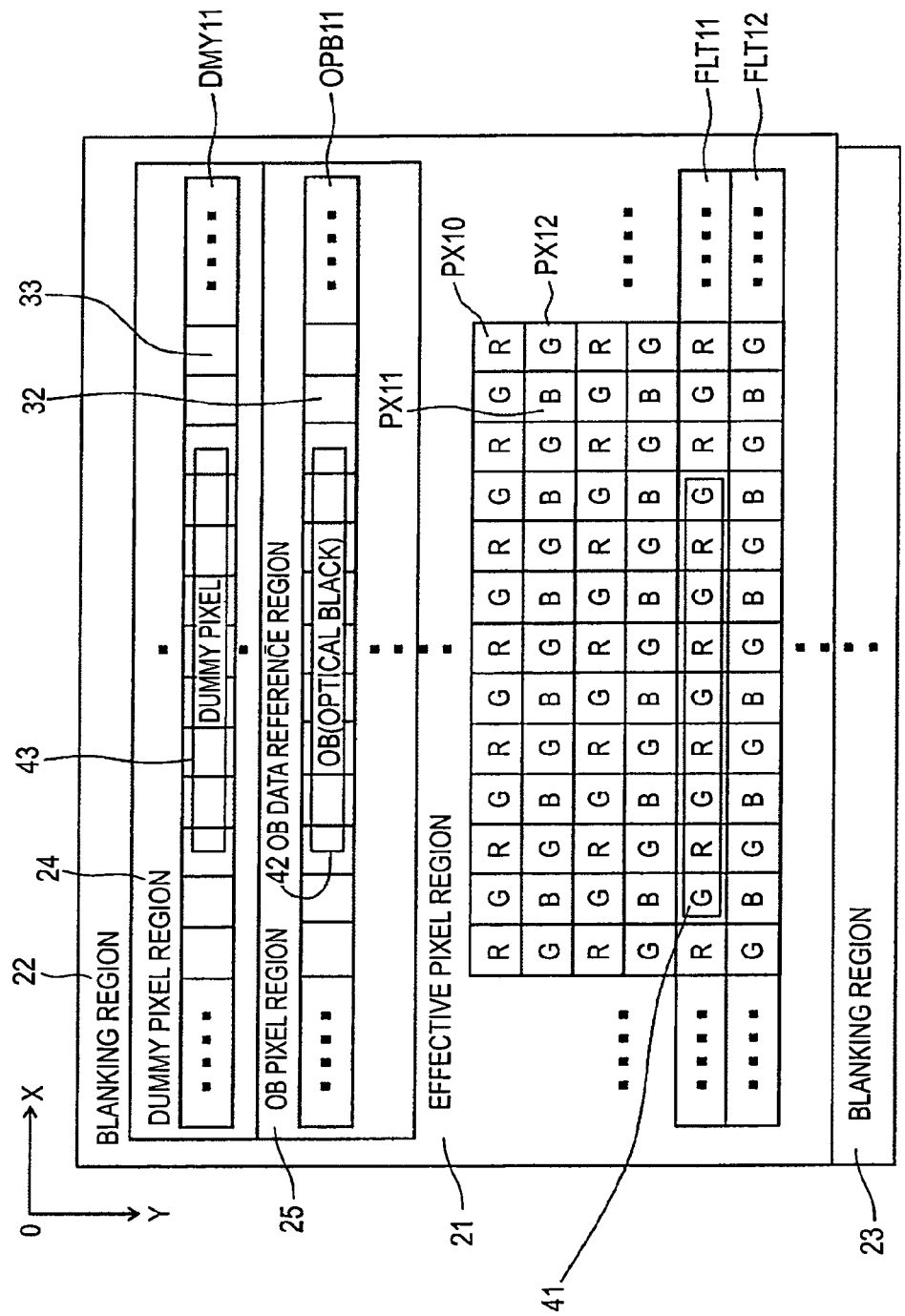
FIG. 4 is a view showing an example of the configuration of a pixel section shown in FIG. 1.

FIG. 4 is a view showing an example of the configuration of the pixel section 13 shown in FIG. 1.

The pixel section 13 has an effective pixel region 21, which has a plurality of effective pixels 31 each of which has a filter corresponding to one of RGB colors, and blanking regions 22 and 23, as shown in FIG. 4.

The blanking region 22 has an OB pixel region 25, which has a plurality of optical black (OB) pixels 32, and a dummy pixel region 24, which has a plurality of dummy pixels 33.

The effective pixel region 21 includes a pixel PX10 of an R (red) transmission filter, a pixel PX11 of a B (blue) transmission filter, and a pixel PX12 of a G (green) transmission filter as the effective pixels 31, and these pixels are arrayed in a matrix.

The effective pixel region 21 has a first filter row FLT11 in which the pixel PX10 of the R transmission filter and the pixel PX12 of the G transmission filter are alternately repeated in a horizontal direction (X direction).

The effective pixel region 21 has a second filter row FLT12 in which the pixel PX12 of the G transmission filter and the pixel PX11 of the B transmission filter are alternately repeated in the horizontal direction.

In the effective pixel region 21, the first and second filter rows FLT11 and FLT12 are alternately arrayed repeatedly in a vertical direction (Y direction).

The pixel PX12 of the G transmission filter of the first filter row FLT11 and the pixel PX12 of the G transmission filter of the second filter row FLT12 are arrayed so as not to overlap each other in the vertical direction. Generally, this filter arrangement is used as a Bayer arrangement.

Moreover, similar to the effective pixel 31 which has a filter of RGB, a defective pixel may exist in an OB row OPB11 in which the OB pixel 32 is in the shaded state.

There is no defect in a dummy pixel row DMY11.

These pixel outputs are alternately output from a plurality of dummy pixel rows DMY11, a plurality of OB rows OPB11, and the first and second filter rows FLT11 and FLT12.

In the present embodiment, defect detection and correction processing is performed in the plurality of OB rows OPB11 and a plurality of rows of effective pixel regions 21.

<3. Example of the Configuration of a Defect Detection and Correction Circuit>

Figure 5:
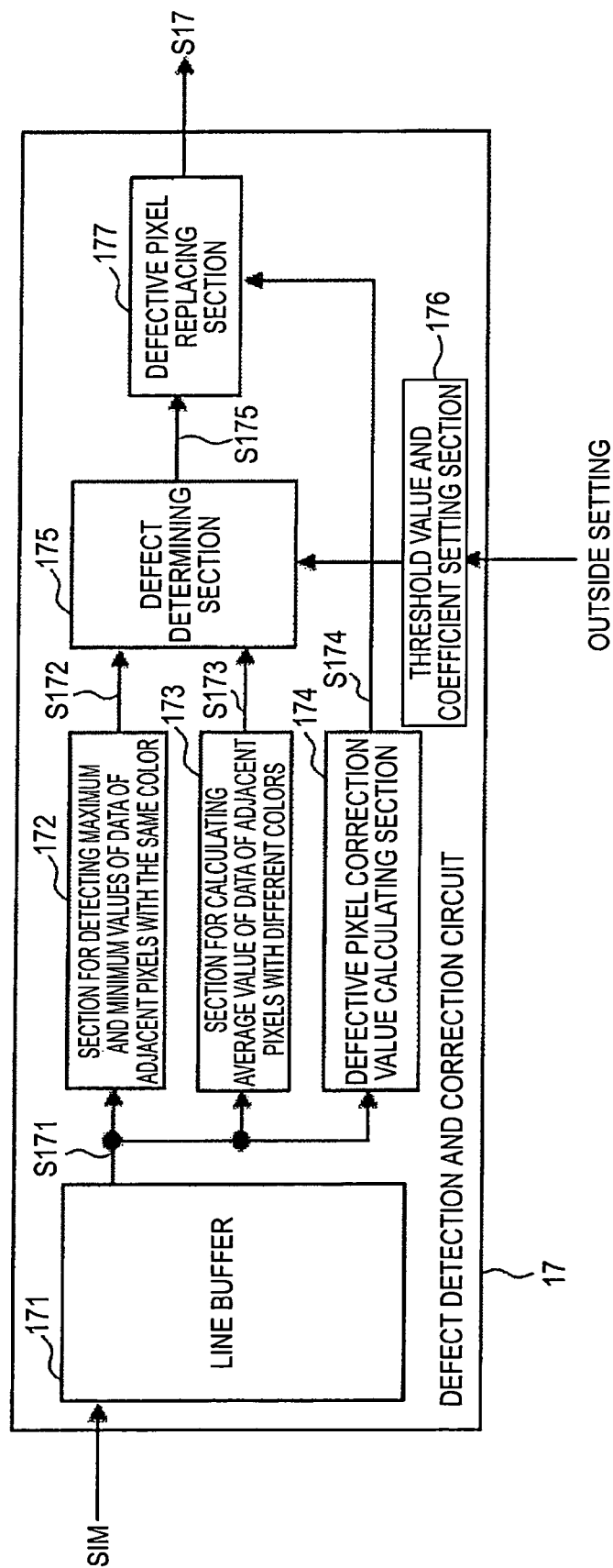
FIG. 5 is a view showing an example of the configuration of the defect detection and correction circuit according to the present embodiment.

FIG. 5 is a view showing an example of the configuration of the defect detection and correction circuit 17 as the pixel defect detection and correction device according to the present embodiment.

Figure 6:
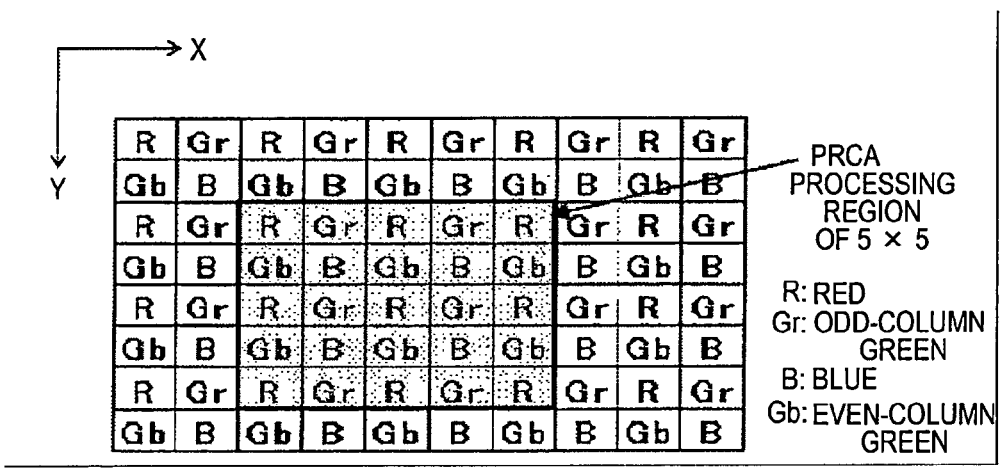
FIG. 6 is a view showing an example of the processing region of 5 pixels×5 pixels on the Bayer arrangement.

FIG. 6 is a view showing an example of the processing region (5 pixels×5 pixels) on the Bayer arrangement.

Figure 7:
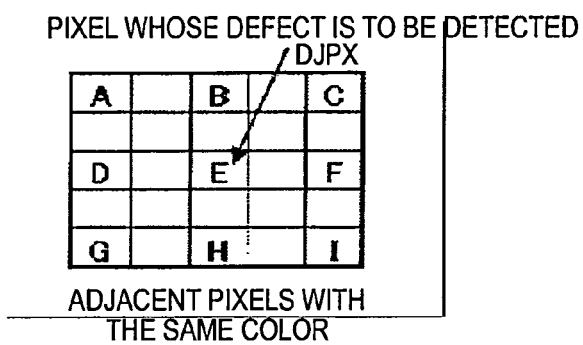
FIG. 7 is an explanatory view of adjacent pixels with the same color.

FIG. 7 is an explanatory view of adjacent pixels with the same color.

Figure 8:
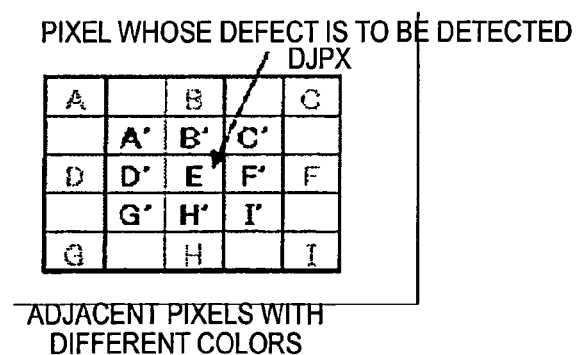
FIG. 8 is an explanatory view of adjacent pixels with different colors.

FIG. 8 is an explanatory view of adjacent pixels with different colors.

As shown in FIG. 5, the defect detection and correction circuit 17 includes a line buffer 171, a section for detecting maximum and minimum values of data of adjacent pixels with the same color 172 which serves as a detection section, a section for calculating an average value of data of adjacent pixels with different colors 173 which serves as an average value acquisition section, and a defective pixel correction value calculating section 174.

The defect detection and correction circuit 17 includes a defect determining section 175, a threshold value and coefficient setting section 176, and a defective pixel replacing section 177.

The line buffer 171 is formed by a memory for four lines and generates a processing region PRCA of (5 pixels in the horizontal direction)×(5 pixels in the vertical direction), which has a pixel of interest (a pixel whose defect is to be detected DJPX) in the middle, from a Bayer arrangement signal SIM output from the pixel section 13, as shown in FIG. 6.

The line buffer 171 outputs a signal S171, which includes the information regarding the generated processing region PRCA, to the section for detecting maximum and minimum values of data of adjacent pixels with the same color 172, the section for calculating an average value of data of adjacent pixels with different colors 173, and the defective pixel correction value calculating section 174.

Here, the horizontal direction is an X direction on the coordinate system shown in FIG. 6, and the vertical direction is a Y direction.

The section for detecting maximum and minimum values of data of adjacent pixels with the same color 172 selects (detects) the maximum value MAX and the minimum value MIN from adjacent pixels A to I (except for E) with the same color shown in FIG. 7.

Here, the pixel denoted by the reference numeral E in FIG. 7 is a pixel whose defect is to be detected DJPX.

The section for detecting maximum and minimum values of data of adjacent pixels with the same color 172 outputs the detection result to the defect determining section 175 as a signal S172.

In addition, the section for detecting maximum and minimum values of data of adjacent pixels with the same color 172 may be configured to detect the second maximum value and the second minimum excluding the maximum value and the minimum value from the pixel values of adjacent pixels with the same color except for a pixel whose defect is to be detected.

The section for calculating an average value of data of adjacent pixels with different colors 173 calculates the average value of adjacent pixels A' to I' (except for E) with different colors shown in FIG. 8.

The section for calculating an average value of data of adjacent pixels with different colors 173 outputs the calculation result to the defect determining section 175 as a signal S173.

The defective pixel correction value calculating section 174 calculates the pixel value for replacement when the pixel whose defect is to be detected DJPX is defective.

The defective pixel correction value calculating section 174 outputs the calculated pixel value to the defective pixel replacing section 177 as a signal S174.

The defect determining section 175 multiplies the output value of the section for detecting maximum and minimum values of data of adjacent pixels with the same color 172, which is located at the preceding stage, by coefficients CMAX and CMIN by which the maximum and minimum values MAX and MIN of an adjacent pixel SCAP with the same color set by the threshold value and coefficient setting section 176 are multiplied.

The defect determining section 175 adds the threshold value JVth of the average value AVR of adjacent pixels DCAP with different colors to the average value AVR, which is an output of the section for calculating an average value of data of adjacent pixels with different colors 173, and also subtracts the threshold value JVth from the average value AVR.

The defect determining section 175 compares a pixel whose defect is to be detected DJPX (E) with each of the multiplication result and the addition result as a threshold value, and determines whether or not it is a defective pixel.

Specifically, the defect determining section 175 determines the following conditions. If at least one of the conditions is satisfied, the defect determining section 175 determines that the pixel whose defect is to be detected E is a defective pixel.

[Condition 1: Comparison of Adjacent Pixels with the Same Color]

$$MAX \times CMAX < VLE$$

$$MIN \times CMIN > VLE$$

Here, MAX, CMAX, MIN, CMIN, and VLE indicate the maximum value of adjacent pixels with the same color, the same-color maximum value determination coefficient, the minimum value of adjacent pixels with the same color, the same-color minimum value determination coefficient, and the pixel value of the pixel whose defect is to be detected E, respectively.

[Condition 2: Comparison of Adjacent Pixels with Different Colors]

$$VLE < AVR - JVth$$

$$AVR + JVth < VLE$$

Here, VLE, AVR, and JVth indicate the pixel value of the pixel whose defect is to be detected E, the average value of adjacent pixels with different colors, and the different-color determination threshold value, respectively.

The defect determining section 175 outputs the determination result to the defective pixel replacing section 177 as a signal S175.

According to the output of the defect determining section 175, the defective pixel replacing section 177 replaces the pixel value VLE of the pixel whose defect is to be detected E with the defective pixel correction value calculated by the defective pixel correction value calculating section 174.

The defective pixel replacing section 177 outputs an image signal including the correction data as a signal S17.

Here, the different-color determination threshold value JVth may be differently set for every color filter, and the setting may be changed according to the color temperature.

In this case, the condition 2 is processed as the following condition 2a.

[Condition 2a: Comparison of Adjacent Pixels with Different Colors (Color Filter Weighting)]

VLE<AVR−JVth×WRGB

AVR+JVth×WRGB<VLE

Here, as described above, VLE, AVR, and JVth indicate the pixel value of the pixel whose defect is to be detected E, the average value of adjacent pixels with different colors, and the different-color determination threshold value, respectively. In addition, WRGB indicates the weighting value for each of RGB.

<4. Explanation Regarding Defect Detection and Correction Processing>

Figure 9:
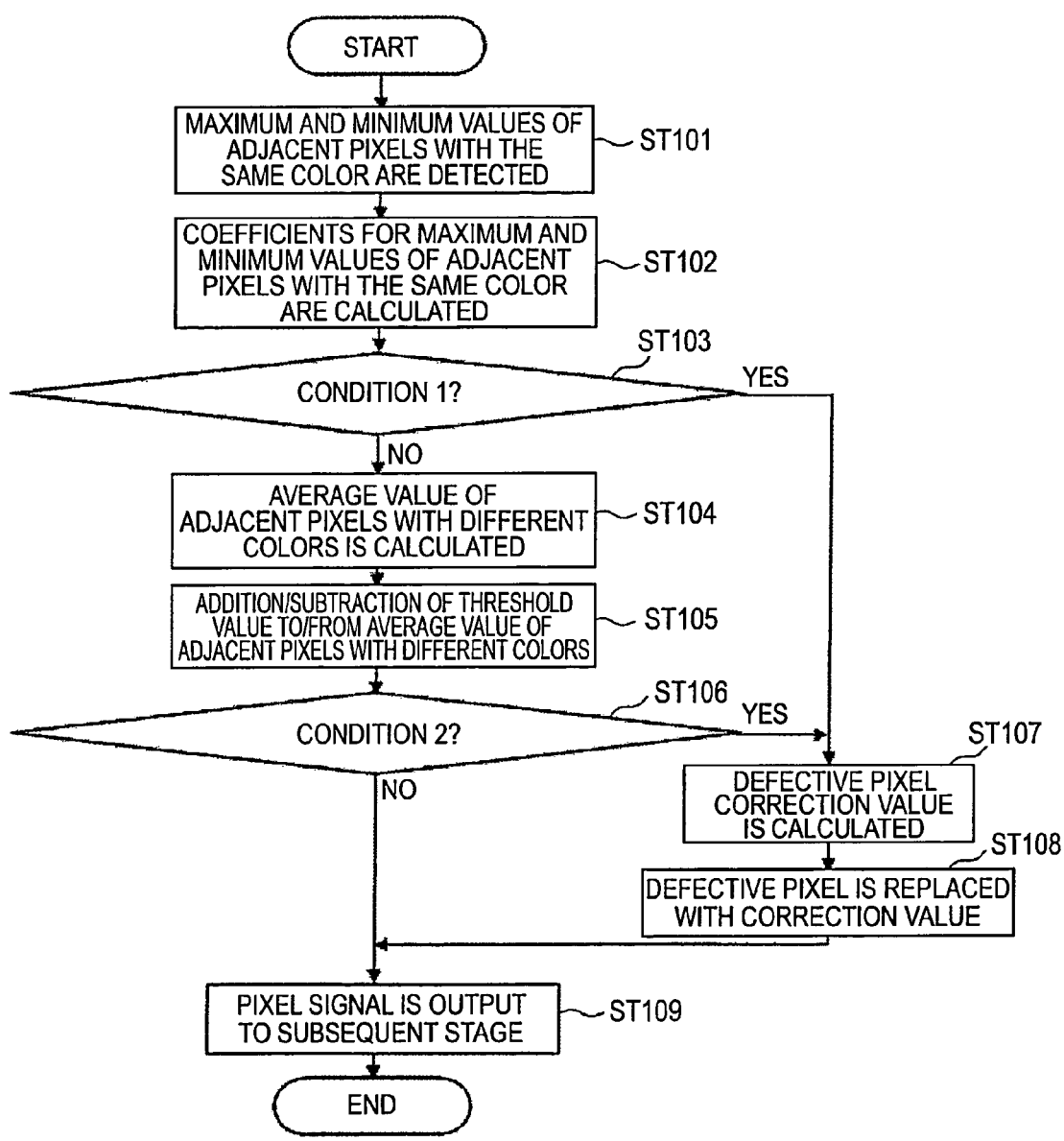
FIG. 9 is a view showing the flowchart of defect detection and correction processing of the defect detection and correction circuit according to the present embodiment shown in FIG. 5.

FIG. 9 is a view showing the flow chart of defect detection and correction processing of the defect detection and correction circuit according to the present embodiment shown in FIG. 5.

[Step ST101]

First, in step ST101, the line buffer 171 generates the processing region PRCA of (5 pixels in the horizontal direction)×(5 pixels in the vertical direction), which has a pixel of interest (pixel whose defect is to be detected DJPX) in the middle, from the Bayer arrangement signal SIM output from the pixel section 13.

A signal S171 including the information regarding the processing region PRCA generated by the line buffer 171 is output to the section for detecting maximum and minimum values of data of adjacent pixels with the same color 172, the section for calculating an average value of data of adjacent pixels with different colors 173, and the defective pixel correction value calculating section 174.

The section for detecting maximum and minimum values of data of adjacent pixels with the same color 172 detects the maximum value MAX and the minimum value MIN from the adjacent pixels A to I (except for E) with the same color shown in FIG. 7.

The detection result is supplied to the defect determining section 175 as a signal S172.

[Step ST102]

In step ST102, the defect determining section 175 multiplies the supplied maximum and minimum values MAX and MIN by the coefficients CMAX and CMIN by which the maximum and minimum values MAX and MIN of the adjacent pixel SCAP with the same color set by the threshold value and coefficient setting section 176 are multiplied.

Instead of the multiplication using a coefficient, it is also possible to set the threshold value from the outside and perform addition or subtraction.

Alternatively, instead of processing for the maximum and minimum values, it is also possible to multiply a difference between the maximum and minimum values by a coefficient and add or subtract the threshold value. In this case, the condition 1 is the following condition 1a.

[Condition 1a: Comparison of Adjacent Pixels with the Same Color]

DFMXMN×CDFMXMN+MAX<VLE

MIN−DFMXMN×CDFMXMN>VLE

Here, DFMXMN, CDFMXMN, MAX, and VLE indicate a difference between maximum and minimum values, a coefficient of a difference between maximum and minimum values, the maximum value, and the pixel value of the pixel whose defect is to be detected E, respectively.

[Step ST103]

In step ST103, the defect determining section 175 determines whether or not the multiplication result satisfies the condition 1.

Moreover, in step ST103, the defect determining section 175 determines the condition 1 or the conditions 1a. Alternatively, the defect determining section 175 may determine both the condition 1 and the condition 1a.

[Step ST104]

If it is determined that the condition 1 is not satisfied in step ST103, the section for calculating an average value of data of adjacent pixels with different colors 173 calculates the average value of the adjacent pixels A' to I' (except for E) with different colors in step ST104.

The calculated average value is supplied to the defect determining section 175 as a signal S173.

[Step ST105]

In step ST105, the defect determining section 175 adds the threshold value JVth of the average value AVR of the adjacent pixels DCAP with different colors to the average value AVR, which is an output of the section for calculating an average value of data of adjacent pixels with different colors 173, and also subtracts the threshold value JVth from the average value AVR.

[Step ST106]

In step ST106, the defect determining section 175 determines whether or not the multiplication result satisfies the condition 2.

Moreover, in step ST106, the defect determining section 175 determines the condition 2 or the conditions 2a. Alternatively, the defect determining section 175 may determine both the condition 2 and the condition 2a.

In addition, the determination result of the defect determining section 175 is supplied to the defective pixel replacing section 177 as a signal S175.

[Step ST107]

If it is determined that the condition 1 is satisfied in step ST103 or if it is determined that the condition 2 is satisfied in step ST106, the pixel value for replacement when the pixel whose defect is to be detected DDPX is defective is calculated by the defective pixel correction value calculating section 174 in step ST106. This pixel value is supplied to the defective pixel replacing section 177 as a signal S174.

[Step ST108]

In step ST108, according to the output of the defect determining section 175, the defective pixel replacing section 177 replaces the pixel value VLE of the pixel whose defect is to be detected E with the defective pixel correction value calculated by the defective pixel correction value calculating section 174.

[Step ST109]

In step ST109, an image signal including the correction data after processing in step ST108 is output to the subsequent processing system as a signal S17.

Or in step ST109, the image signal S17 which does not include the correction data is output to the subsequent processing system when it is determined that the condition 2 is not satisfied in step ST106. That is, the pixel whose defect is to be detected DJPX (E) is output as it is.

In addition, the processing in step ST107 may be performed in preceding stages of steps ST101, ST102, and ST103.

Next, a defect detection and correction processing system when the average value of six pixels excluding the maximum and minimum values is set as the average value of adjacent pixels with different colors will be described.

Figure 10:
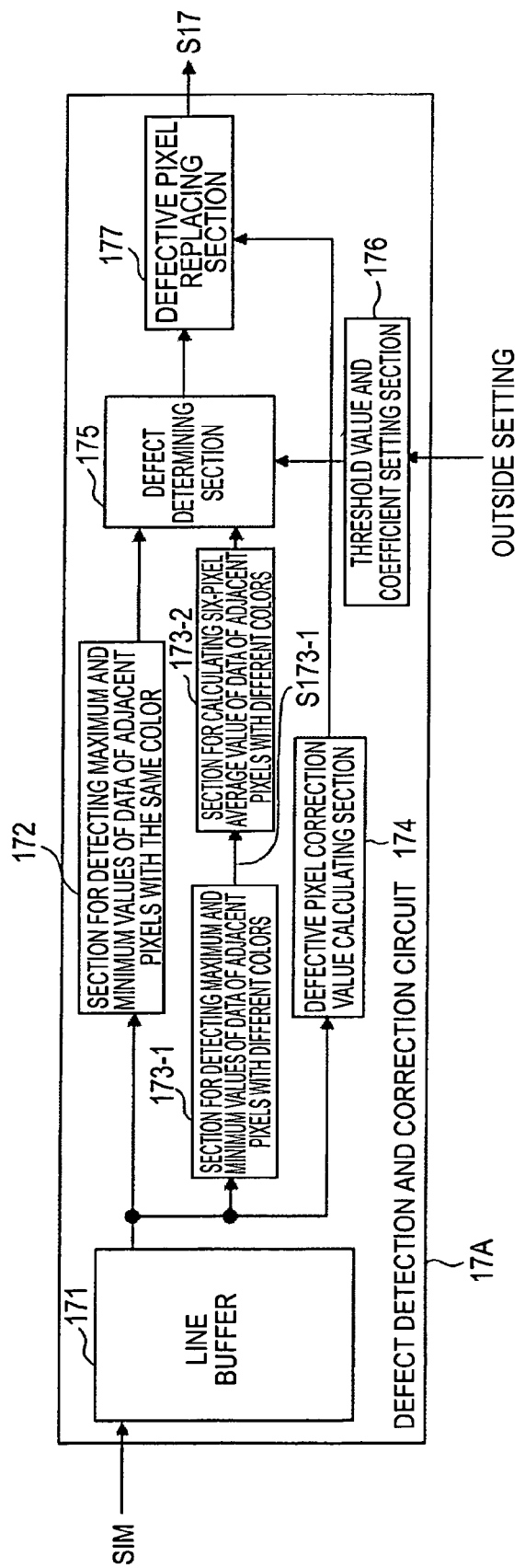
FIG. 10 is a view showing a second example of the configuration of a defect detection and correction circuit according to the present embodiment and is also a view showing a defect detection and correction circuit which sets the average value of six pixels excluding the maximum and minimum values as the average value of adjacent pixels with different colors.

FIG. 10 is a view showing a second example of the configuration of the defect detection and correction circuit according to the present embodiment and is also a view showing the defect detection and correction circuit which sets the average value of six pixels excluding the maximum and minimum values as the average value of adjacent pixels with different colors.

In a defect detection and correction circuit 17A shown in FIG. 10, the section for calculating an average value of data of adjacent pixels with different colors 173 of the defect detection and correction circuit 17 shown in FIG. 5 is replaced with a section for detecting maximum and minimum values of data of adjacent pixels with different colors 173-1 and a section for calculating a six-pixel average value of data of adjacent pixels with different colors 173-2.

The section for detecting maximum and minimum values of data of adjacent pixels with different colors 173-1 calculate the maximum and minimum values of adjacent pixels with different colors A' to I' (except for E).

The section for detecting maximum and minimum values of data of adjacent pixels with different colors 173-1 outputs the calculation result to the section for calculating a six-pixel average value of data of adjacent pixels with different colors 173-2 as a signal S173-1.

The section for calculating a six-pixel average value of data of adjacent pixels with different colors 173-2 calculates the average value of six pixels excluding two pixels of the maximum and minimum values from the adjacent pixels with different colors A' to I' (eight pixels except for E).

The section for calculating a six-pixel average value of data of adjacent pixels with different colors 173-2 outputs the calculation result to the defect determining section 175.

The other configuration and function of the defect detection and correction circuit 17A shown in FIG. 10 are the same as those of the defect detection and correction circuit 17 shown in FIG. 5.

Figure 11:
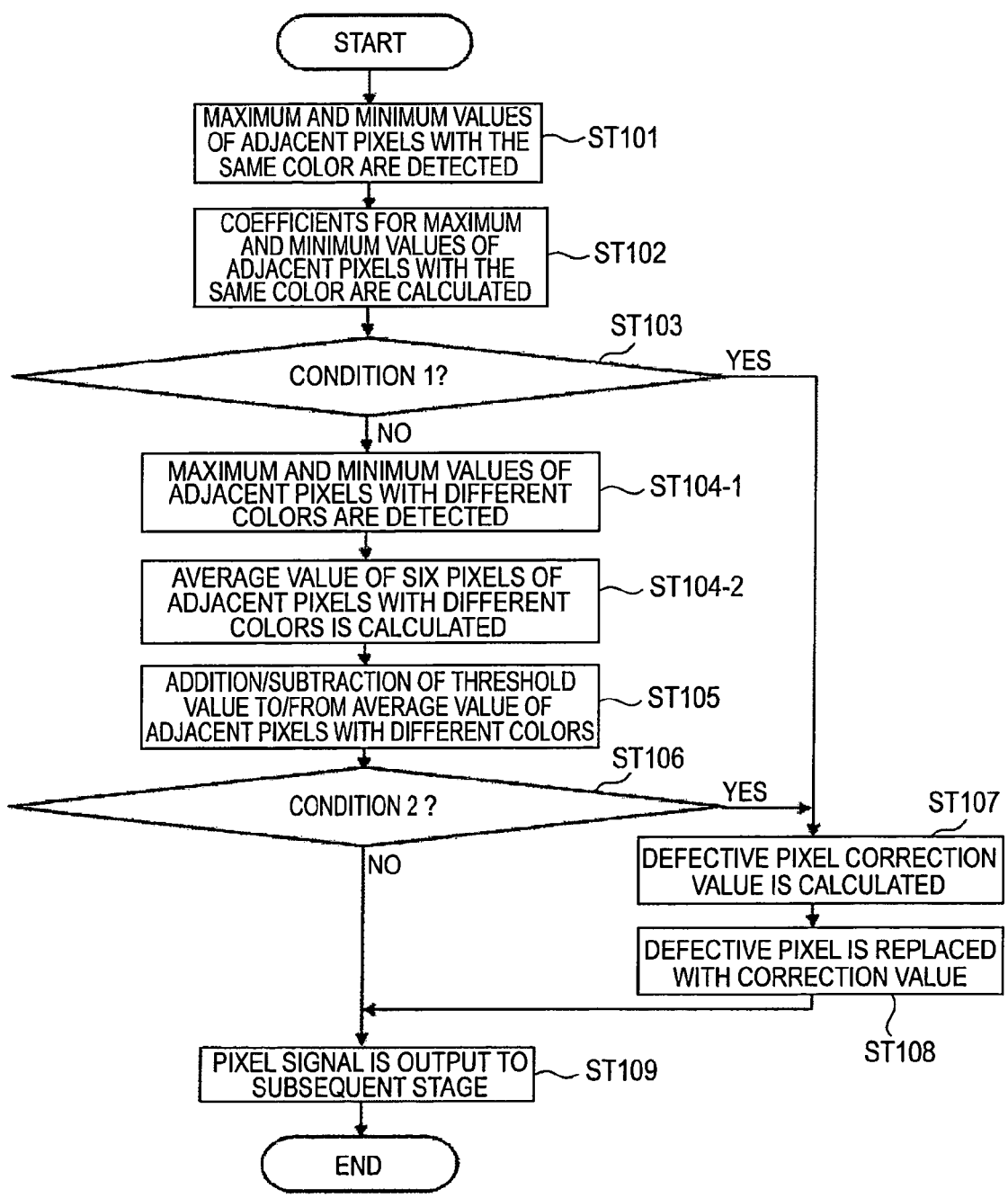
FIG. 11 is a view showing the flow chart of defect detection and correction processing of the defect detection and correction circuit according to the present embodiment shown in FIG. 10.

FIG. 11 is a view showing the flow chart of defect detection and correction processing of the defect detection and correction circuit according to the present embodiment shown in FIG. 10.

In the processing shown in FIG. 11, processing in step ST104 shown in FIG. 9 is replaced with processing in steps ST104-1 and ST104-2. Except for this, the processing shown in FIG. 11 is the same as the processing shown in FIG. 9.

Step ST104-1 is processing of the section for detecting maximum and minimum values of data of adjacent pixels with different colors 173-1.

Step ST104-2 is processing of the section for calculating a six-pixel average value of data of adjacent pixels with different colors 173-2.

Thus, defect detection precision when a defective pixel exists in adjacent pixels with different colors can be improved by setting the average value of six pixels excluding the maximum and minimum values as the average value of adjacent pixels with different colors.

In addition, the pixel section 13 shown in FIG. 1 is not limited to the single plate type imaging device as shown in FIG. 4, and a three plate type imaging device may also be used.

An actual calculation example is shown in FIG. 12.

The resolution of each pixel value is set to 10 bits (0 to 1023).

In FIG. 12, a pixel whose defect is to be detected is "940".

In this case, the maximum value of adjacent pixels with the same color is "1023" and the minimum value thereof is "227", and the maximum value of adjacent pixels with different colors is "1023" and the minimum value thereof is "190".

When determining the threshold value using the maximum and minimum values, the maximum value is "1023" in both cases of the same color and different colors. Accordingly, since the upper limit of the threshold value is calculated by multiplying "1023" by the coefficient, the value exceeding "1023" is calculated.

Here, assuming that the upper limit of the pixel value resolution is set, it is not possible to determine the pixel whose defect is to be detected as a defective pixel because the value of the pixel whose defect is to be detected is "940". The same is true for the minimum value.

For this reason, the method according to the present embodiment is applied.

In this case, the average value of adjacent pixels with different colors is "265.75". Accordingly, even though the different-color determination threshold value of the [condition 2] is relatively largely set to the half "512" of pixel value resolution, the pixel whose defect is to be detected can be determined to be a defective pixel because the [condition 2] is sufficiently satisfied.

The following method may be applied as the method of determining the different-color determination threshold value and the same-color maximum value/minimum value determination coefficient.

That is, satisfactory operation setting can be selected by defining each defect according to the existence of a light source, operating the threshold value and the coefficient from the higher defect correction intensity toward the lower defect correction intensity, and setting the place, at which the number of remaining defects increases, as an optimal threshold value and an optimal coefficient.

As described above, according to the present embodiment, the following effects can be acquired.

That is, according to this embodiment, even when a pixel with a high brightness level, such as a reflective portion, exists in the periphery, it is possible to easily detect a defective pixel using a relatively simple circuit or method.

Moreover, since the configuration is simple, it is also possible to suppress the circuit size and the power consumption.

In addition, each embodiment described above is applied to a solid state imaging apparatus which uses a CMOS image sensor as an image sensor (solid state imaging device).

The solid state imaging apparatus may be applied to apparatuses having various imaging functions, such as a mobile phone, a video camera, and a digital still camera, for example.

Moreover, the method described in detail above may also be realized as a program according to the above procedures which is executed by a computer, such as a CPU.

In addition, such a program may be recorded in recording media, such as semiconductor memory, a magnetic disk, an optical disk, and a floppy (registered trademark) disk, and a computer with the recording media set therein may access and execute the program.

The present application contains subject matter related to that disclosed in Japanese Priority Patent Application JP 2009-252447 filed in the Japan Patent Office on Nov. 2, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A pixel defect detection and correction device comprising:
    an average value acquisition section that acquires an average value of pixel values of adjacent pixels with different colors excluding a pixel whose defect is to be detected, which is a pixel of interest, in a processing region where a plurality of adjacent pixels with the same color and a plurality of adjacent pixels with different colors are arrayed with the pixel whose defect is to be detected in the middle; and
    a defect determining section that determines whether or not the pixel whose defect is to be detected is defective on the basis of at least the average value acquired by the average value acquisition section,
    wherein the defect determining section determines whether or not the pixel whose defect is to be detected is defective by comparison of the pixel value of the pixel whose defect is to be detected, the average value of adjacent pixels with different colors acquired by the average value acquisition section, and a designated different-color pixel threshold value,
    wherein the different-color pixel threshold value is variable according to a color of the pixel whose defect is to be detected which is a pixel of interest.

2. The pixel defect detection and correction device according to claim 1,
    wherein the average value acquisition section acquires the average value of pixel values of all adjacent pixels with different colors excluding the pixel whose defect is to be detected.

3. The pixel defect detection and correction device according to claim 2,
    wherein the average value acquisition section acquires the average value of pixel values excluding maximum and minimum values, among pixel values of adjacent pixels with different colors excluding the pixel whose defect is to be detected.

4. The pixel defect detection and correction device according to claim 1,
    wherein the defect determining section determines that the pixel whose defect is to be detected is defective either when the pixel value of the pixel whose defect is to be detected is lower than a value obtained by subtracting a designated different-color determination threshold value from the average value of adjacent pixels with different colors or when the pixel value of the pixel whose defect is to be detected is higher than a value obtained by adding the designated different-color determination threshold value to the average value of adjacent pixels with different colors.

5. The pixel defect detection and correction device according to claim 1,
    wherein the defect determining section determines that the pixel whose defect is to be detected is defective either when the pixel value of the pixel whose defect is to be detected is lower than a value obtained by subtracting a value, which is obtained by multiplying the designated different-color determination threshold value by a weighting coefficient for every color, from the average value of adjacent pixels with different colors or when the pixel value of the pixel whose defect is to be detected is higher than a value obtained by adding the value, which is obtained by multiplying the designated different-color determination threshold value by a weighting coefficient for every color, to the average value of adjacent pixels with different colors.

6. A pixel defect detection and correction device comprising:
    an average value acquisition section that acquires an average value of pixel values of adjacent pixels with different colors excluding a pixel whose defect is to be detected, which is a pixel of interest in a processing region where a plurality of adjacent pixels with the same color and a plurality of adjacent pixels with different colors are arrayed with the pixel whose defect is to be detected in the middle;
    a defect determining section that determines whether or not the pixel whose defect is to be detected is defective on the basis of at least the average value acquired by the average value acquisition section; and
    a detection section that detects at least maximum and minimum values from the pixel values of adjacent pixels with the same color, excluding the pixel whose defect is to be detected, in the processing region,
    wherein the defect determining section determines whether or not the pixel whose defect is to be detected is defective by comparison of the pixel value of the pixel whose defect is to be detected, the average value of adjacent pixels with different colors acquired by the average value acquisition section, and a designated different-color pixel threshold value, and
    wherein the defect determining section has a first determination function of performing a first determination, which is a determination regarding whether or not the pixel whose defect is to be detected is defective by comparing the pixel value of the pixel whose defect is to be detected with the maximum and minimum values of the pixel values of the adjacent pixels with the same color detected by the detection section, and a second determination function of performing a second determination, which is a determination regarding whether or not the pixel whose defect is to be detected is defective by comparing the pixel value of the pixel whose defect is to be detected with the average value of adjacent pixels with different colors acquired by the average value acquisition section.

7. The pixel defect detection and correction device according to claim 6,
    wherein the defect determining section performs second determination processing using the second determination function when it is determined that the pixel whose defect is to be detected is not defective in the first determination.

8. The pixel defect detection and correction device according to claim 6,
    wherein the detection section detects a second maximum value and a second minimum value excluding the maximum and minimum values from the pixel values of adjacent pixels with the same color excluding the pixel whose defect is to be detected and outputs the second maximum and minimum values to the defect determining section.

9. The pixel defect detection and correction device according to claim 1 further comprising:

a replacement pixel value acquisition section that acquires a pixel value for replacement when the pixel whose defect is to be detected is defective; and a defective pixel replacing section that replaces the pixel value of the pixel whose defect is to be detected with the pixel value acquired by the replacement pixel value acquisition section according to a determination result of the defect determining section.

10. A pixel defect detection and correction device comprising:
   a defect determining section configured to determine whether a given pixel is defective;
   a different-color detection section that acquires an average value AVG of pixel values of pixels that are adjacent to the given pixel and have respective colors different from the given pixel; and
   a same-color detection section that detects a maximum value MAX and a minimum value MIN from pixel values of pixels that are adjacent to the given pixel and have the same color as the given pixel,
   wherein the defect determining section is configured to determine whether or not the given pixel is defective by comparing the pixel value of the given pixel to same-color threshold values respectively corresponding to the maximum value MAX and the minimum value MIN, and different-color threshold values corresponding to the average value AVG.

11. The pixel defect detection and correction device of claim 10,
   wherein the defect determining section is configured to determine whether or not the given pixel is defective on the basis of:
   whether the pixel value of the given pixel exceeds a same-color upper threshold value $SCTH_1$, where $SCTH_1 = (C_{MAX}) \cdot (MAX)$ and $C_{MAX}$ is a coefficient corresponding to MAX;
   whether the pixel value of the given pixel is less than a same-color lower threshold value $SCTH_2$, where $SCTH_2 = (C_{MIN}) \cdot (MIN)$ and $C_{MIN}$ is a coefficient corresponding to MIN;
   whether the pixel value of the given pixel exceeds a different-color upper threshold value $DCTH_1$, where $DCTH_1 = AVG + TH_{AVG}$, where $TH_{AVG}$ is a value corresponding to AVG; and
   whether the pixel value of the given pixel is less than a same-color lower threshold value $DCTH_2$, where $DCTH_2 = AVG - TH_{AVG}$.

12. The pixel defect detection and correction device of claim 10,
   wherein the defect determining section is configured to determine whether or not the given pixel is defective by performing a first determination based on comparing the pixel value of the given pixel to the maximum value MAX and the minimum value MIN and a second determination based on comparing the pixel value of the given pixel with the average value AVG.

13. The pixel defect detection and correction device of claim 12,
   wherein the defect determining section is configured to perform the second determination only if the defect determining section does not determine from the first determination that the given pixel is defective.

14. The pixel defect detection and correction device of claim 10,
   wherein the values of the different-color threshold values vary according to a color of the given pixel.

15. The pixel defect detection and correction device of claim 11,
   wherein the value of $TH_{AVG}$ varies according to a color of the given pixel.

16. The pixel defect detection and correction device of claim 15,
   wherein $TH_{AVG} = (JV_{TH}) \cdot (W_{RGB})$, where $JF_{TH}$ is a predetermined value corresponding to AVG and $W_{RGB}$ is a weighting factor whose value depends on the color of the given pixel.

17. The pixel defect detection and correction device of claim 10,
   wherein the defect determining section is configured to determine whether or not the given pixel is defective on the basis of:
   whether the pixel value of the given pixel exceeds a same-color upper threshold value $SCTH_1$, where $SCTH_1 = MAX + TH_{MAX}$ and $TH_{MAX}$ is a value corresponding to MAX;
   whether the pixel value of the given pixel is less than a same-color lower threshold value $SCTH_2$, where $SCTH_2 = MIN + TH_{MIN}$ and $TH_{MIN}$ is a value corresponding to MIN;
   whether the pixel value of the given pixel exceeds a different-color upper threshold value $DCTH_1$, where $DCTH_1 = AVG + TH_{AVG}$, where $TH_{AVG}$ is a value corresponding to AVG; and
   whether the pixel value of the given pixel is less than a same-color lower threshold value $DCTH_2$, where $DCTH_2 = AVG - TH_{AVG}$.

18. The pixel defect detection and correction device of claim 17,
   wherein a same-color detection section is configured to determine a difference $\Delta_{MAX/MIN}$ between the maximum value MAX and the minimum value MIN,
   $TH_{MAX} = (\Delta_{MAX/MIN}) \cdot (C_{MAX})$, where $C_{MAX}$ is a coefficient corresponding to MAX, and
   $TH_{MIN} = (\Delta_{MAX/MIN}) \cdot (C_{MIN})$, where $C_{MIN}$ is a coefficient corresponding to MIN.

19. The pixel defect detection and correction device of claim 10,
   wherein a first group of pixels includes pixels that are within a detection region of five pixels by five pixels with the given pixel at its center and that have the same color as the given pixel,
   wherein a second group of pixels consists of the first group of pixels excluding the given pixel and excluding a pixel having a maximum pixel value and a pixel having a minimum pixel value,
   wherein the same-color detection section detects the maximum value MAX and the minimum value MIN from pixel values of pixels in the second group of pixels.

20. The pixel defect detection and correction device of claim 10,
   wherein a first group of pixels includes all pixels that are within a detection region of three pixels by three pixels with the given pixel at its center,
   wherein a second group of pixels consists of the first group of pixels excluding the given pixel and excluding a pixel having a maximum pixel value and a pixel having a minimum pixel value,
   wherein the different-color detection section acquires the average value AVG from pixel values of pixels in the second group of pixels.

* * * * *